March 25, 1969 V. VODICKA 3,435,270
ELECTROLUMINESCENT DISPLAY DEVICE WITH INDICIA ELECTRODES AND CIRCUIT LEADS OF METAL FOIL
Filed April 4, 1966 Sheet 1 of 2
Fig. 1.
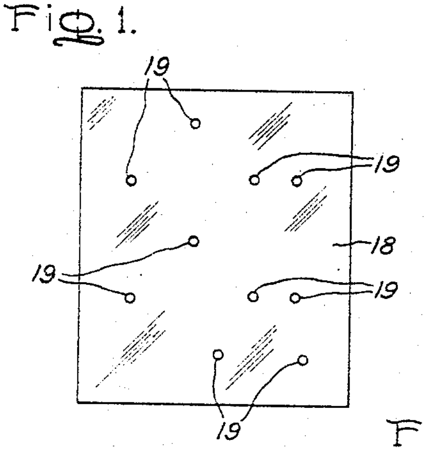
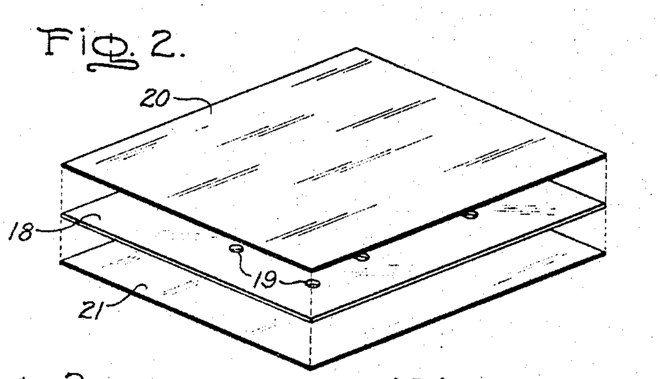
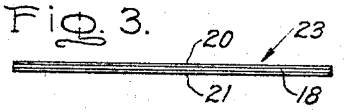
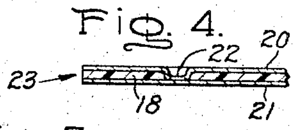
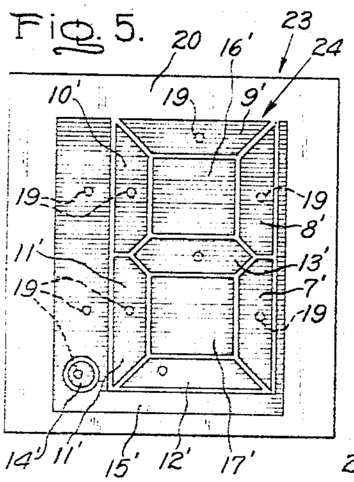
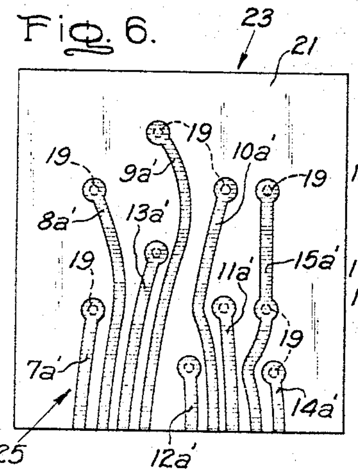
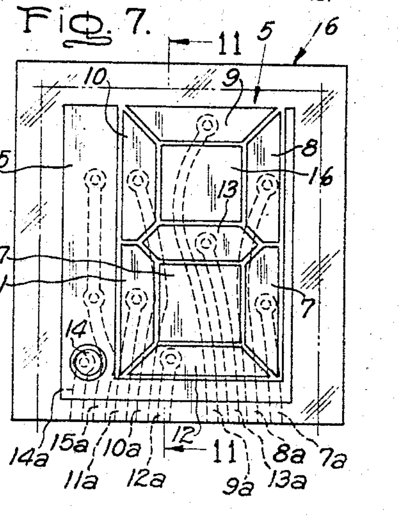
Fig. 8.
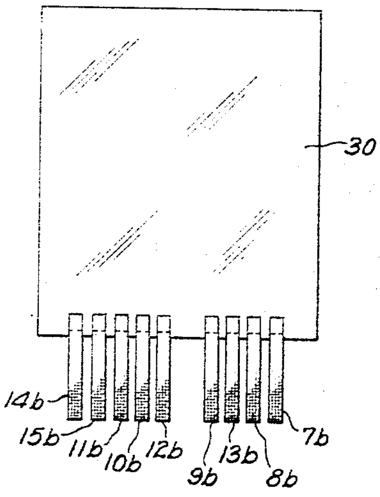
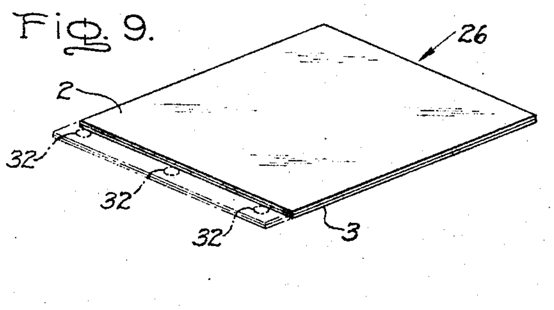
Inventor:
Vincent Vodicka
by James J. Lazna
His Attorney Inventor:
Vincent Vodicka
by James J. Lazna
His Attorney United States Patent Office 3,435,270

Patented Mar. 25, 1969

3,435,270

ELECTROLUMINESCENT DISPLAY DEVICE WITH INDICIA ELECTRODES AND CIRCUIT LEADS OF METAL FOIL

Vincent Vodicka, South Euclid, Ohio, assignor to General Electric Company, a corporation of New York Filed Apr. 4, 1966, Ser. No. 546,114
Int. Cl. H05b 33/26
U.S. Cl. 313—108 8 Claims

ABSTRACT OF THE DISCLOSURE

An electroluminescent display device has its segmented patterned back electrode and its circuit leads constituted by the residue of metal foil sheets laminated to the opposite sides of an apertured plastic insulator sheet and directly to each other through the apertures therein and respectively etched in the patterns of the segmented electrode and the circuit leads.

This invention relates in general to electroluminescent cells or lamps, and more particularly, to an electroluminescent cell or lamp in the form of an electroluminescent display device or panel such as a digital display or read-out device and to a method of making such a device.

Electroluminescent cells or lamps in the form of display devices or panels such as digital display or read-out devices are well known in themselves at present as disclosed, for example, in U.S. Patent 2,922,993, E. A. Sack, Jr. Such devices comprise in general a layer of a suitable electroluminescent phosphor sandwiched between a pair of electrically conductive layers one of which is light-transmitting and the other of which is subdivided into a plurality of discrete electrode sections of predetermined shape and array such that, upon selective application of an A.C. potential across the light-transmitting electrode layer and one or more of the discrete electrode sections, the areas of the phosphor layer overlying the discrete electrode sections selectively energized are caused to luminesce, thereby producing the desired luminous pattern from the device such as, for example, a digit or a letter.

It has been proposed to form the discrete electrode sections of such electroluminescent display devices, and in some cases also the lead-in conductors for such electrode sections, by the deposition of coatings of a suitable electrically conductive silver or other type silk screen ink or paint in the desired electrode and circuit lead patterns on a plastic sheet. Particularly in the case of those electroluminescent devices, however, which are normally subjected to a heat laminating operation during the final assembly of the component layer elements of the device and which have a multitude of electrode sections and circuit leads, such deposited coating type electrode sections and circuit leads have not proven to be entirely satisfactory due to the tendency for breaks or separations to develop in one or more of the electrode or circuit lead sections, with resulting interruption in the electrical continuity thereof, as a result of the difference between the heat expansion coefficients of the silver ink or paint of which the electrode sections and conductor leads are made and that of the plastic sheet or substrate on which the electrode sections and circuit leads are coated. During the heat laminating of the device, the plastic substrate flows and expands to a much greater degree than the silver ink or paint type electrode sections and conductor leads, thereby creating a tension in the electrode sections and conductor leads which exceeds the elastic limit of the silver ink or paint of which they are made, causing one or more of them to break and to so lose electrical continuity. The electroluminescent display device is thereby rendered inoperable.

It is an object of the invention, therefore, to provide a novel form of electroluminescent display device or panel of the heat laminated type which will not be subject to the development of breaks in, and resulting disruption in the electrical continuity of, the individual electrode sections and conductor leads of the device during the fabrication and usage thereof.

Another object of the invention is to provide an electroluminescent display device or panel of novel construction which lends itself to the production manufacture thereof with a minimum amount of production rejects or inoperative devices.

A further object of the invention is to provide a novel method of making an electroluminescent display device or panel.

Briefly stated, in accordance with one aspect of the invention, the back or pattern-forming electrode component of an electroluminescent display device or panel and the associated conductor leads therefor is constituted by a composite back electrode and circuit lead subassembly comprised of an apertured plastic insulator sheet of a low dielectric constant organic thermoplastic material on the opposite sides of which are laminated metal foil sheets which are in surface engagement with one another through apertures in the insulator sheet and which are selectively etched away in a predetermined pattern to leave the display electrodes on one side of the insulator sheet and the circuit leads on the other side, each circuit lead being in surface engagement with and thus electrically connected to a respective one of the back electrode sections through one or more of the apertures in the insulator sheet. The back electrode subassembly thus formed is then assembled together with an electroluminescent phosphor layer and an overlying light-transmitting front electrode layer, as by laminating it thereto, to thereby form the completed electroluminescent display device or panel according to the invention.

In accordance with a further aspect of the invention, the front electrode layer of the electroluminescent display device is electrically connected to a respective one of the circuit leads on the back electrode subassembly by means of a metal foil connector lead on the electrode carrying side of the back electrode subassembly, the connector lead being etched out of the same metal foil sheet out of which the back electrode is etched and being in surface engagement with the front electrode layer, and also with a respective one of the circuit leads on the back electrode subassembly through one of the apertures in the plastic insulator sheet thereof.

Further objects and advantages of the invention will appear from the following detailed description of species thereof and from the accompanying drawing.

In the drawing, FIG. 1 is a plan view of the apertured plastic insulator sheet employed in the fabrication of a back electrode subassembly for an electroluminescent display device according to the invention.

FIG. 2 is an exploded perspective view illustrating one of the initial steps in the manufacture of an electroluminescent display device according to the invention wherein metal foil sheets are laminated to the opposite sides of the apertured plastic insulator sheet and over the apertures therein so that they surface contact and electrically connect with one another through the apertures in the insulator sheet.

FIG. 3 is an elevational view along an edge of the metal foil-faced laminate which is formed by the laminating step shown in FIG. 2.

FIG. 4 is a fragmentary sectional view on an enlarged scale of the metal foil-faced laminate shown in FIG. 3, the section being taken through one of the apertures in the insulator sheet of the laminate to show the manner in which the metal foil sheets on the opposite sides of the insulator sheet contact and electrically connect with one another through the apertures therein.

FIGS. 5 and 6 are plan views of opposite sides of the metal foil-faced laminate of FIG. 3 following the application thereto of protective coatings of an acid-resist material in the desired electrode and connector lead pattern on one side (FIG. 5) and in the desired circuit lead pattern on the other side (FIG. 6), with each electrode section and connector lead on one side and each circuit lead on the other side being in registry with respective ones of the apertures in the plastic insulator sheet of the laminate.

FIG. 7 is a plan view of the electrode and connector lead side of the laminate of FIG. 3 following the etching away of the unprotected areas of the metal foil sheets on the opposite sides thereof, and the removal therefrom of the patterned acid-resist coatings thereon to expose the underlying metal foil back electrode and connector lead pattern on the one side of the laminate and the circuit lead pattern on the other side thereof.

FIG. 8 is a plan view of the plastic encapsulating sheet which, in accordance with one form of the invention, is laminated to the back side of the electroluminescent display device and which has the terminal contacts for the device temporarily attached in place thereon.

FIG. 9 is a perspective view of a composite sheet of the phosphor and voltage barrier layers which are incorporated in the electroluminescent display device comprising the invention.

Figure 10:
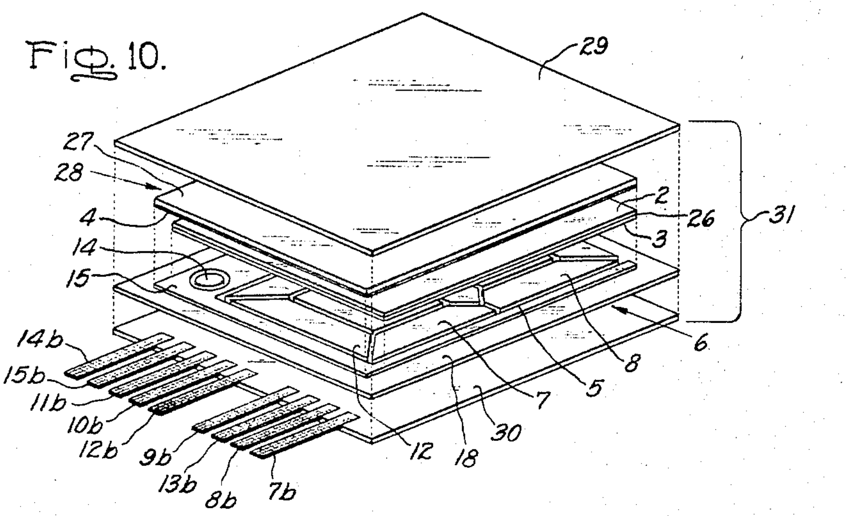

FIG. 10 is an exploded perspective view illustrating the stacked assembly of all the component layers or elements of the electroluminescent display device in preparation for the lamination together thereof to form the final completed device.

Figure 11:
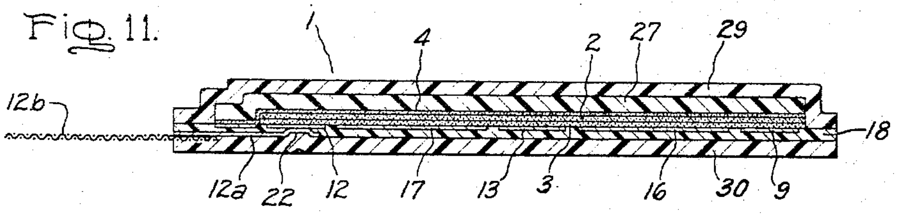

FIG. 11 is a sectional view on an enlarged scale of an electroluminescent display device according to the invention.

Figures 12, 13, 14:
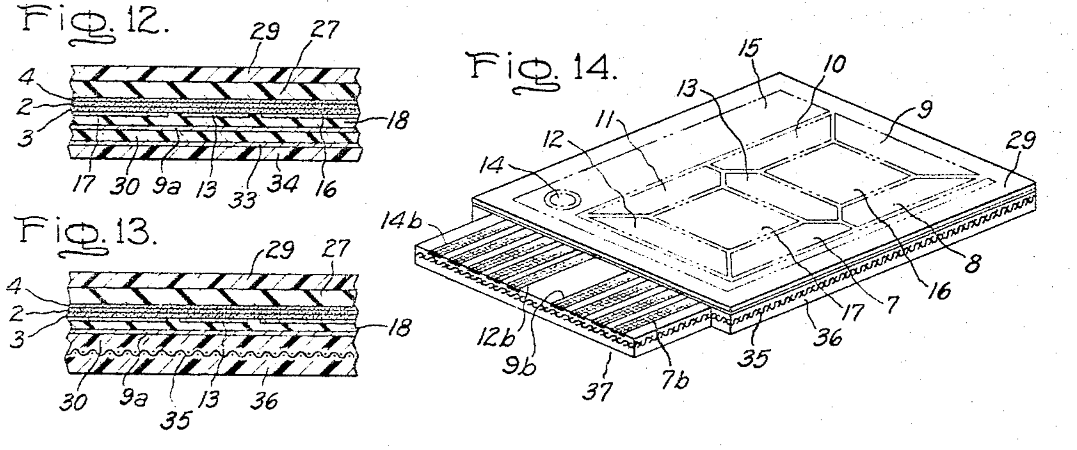

FIG. 12 is a fragmentary sectional view on an enlarged scale of a modified form of electroluminescent display device according to the invention having an additional water vapor barrier provided on its back side.

FIG. 13 is a fragmentary sectional view on an enlarged scale of another modified form of electroluminescent display device according to the invention having an outer plastic stiffening layer affixed thereto.

FIG. 14 is a perspective view of a complete electroluminescent display device according to the invention embodying the modified structure shown in FIG. 13.

Figure 15:
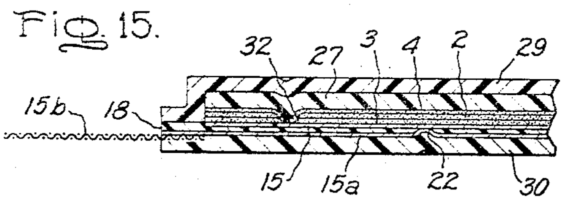

FIG. 15 is a fragmentary sectional view on an enlarged scale of still another modified form of electroluminescent display device according to the invention having a different type of connection between the front electrode layer and the connector lead therefor.

Referring to the drawing, the invention is therein illustrated, for purposes of representation, as applied to an electroluminescent display panel in the form of a digital display device or read-out lamp 1 adapted to selectively display, in a luminous pattern, any digit or numeral from 0 to 9, as desired. It should be understood, however, that the invention is applicable as well to various other forms of electroluminescent display devices for the selective display of various other types or forms of indicia, characters, patterns or designs.

As shown in FIG. 11, the electroluminescent display device 1 according to the invention is comprised in general of an electrically active assembly comprising a thin electroluminescent phosphor layer 2, and preferably in addition a thin contiguous insulating layer 3 of high dielectric constant material, sandwiched between a light-transmitting electrically conductive front electrode layer 4 and a segmented back electrode layer 5 which is disposed next to the insulating layer 3, where such is employed. The phosphor layer 2 is constituted by a self-supporting sheet or film comprising a conventional type electroluminescent phosphor such as, for example, zinc sulfide-zinc oxide combined with suitable activators such as copper, manganese, lead or silver, dispersed in a suitable organic polymeric matrix material of high dielectric constant material such as is commonly employed for such purpose in so-called organic type electroluminescent cells or lamps, as disclosed for example in U.S. Patent 2,945,976, Fridrich et al., dated July 19, 1960. However, plasticized cyanoethyl polyglucosides such as cyanoethyl cellulose plasticized with cyanoethyl phthalate as described and claimed in U.S. Patent 3,238,407, Jaffe, dated Mar. 1, 1966, or cyanoethyl cellulose plasticized with cyanoethyl sucrose as described and claimed in U. S. Patent 3,247,414, Levetan, dated Apr. 19, 1966, are preferred organic matrix materials which form a dense tough film of high dielectric constant and good mechanical and thermal stability. The insulating or voltage barrier layer 3 is comprised of a finely divided insulating material of high dielectric constant such as, for example, barium titanate or titanium dioxide, dispersed in a suitable high dielectric constant organic polymeric matrix material such as that employed for the phosphor layer 2, preferably cyanoethyl cellulose plasticized with cyanoethyl phthalate as referred to above. The light-transmitting electrically conductive front electrode layer 4 may be any type conventionally employed for such purpose in electroluminescent cells or lamps. Preferably, however, the electrode layer 4 is comprised of a light-transmitting electrically conductive lacquer such as, for example, those described and claimed in copending U.S. applications Ser. No. 189,095, Jaffe et al., filed Apr. 20, 1962, and now abandoned, and Ser. No. 333,950, Amans, filed Dec. 27, 1963, now Patent No. 3,295,002, both assigned to the assignee of the present invention, and comprising a dispersion of electrically conductive light-transmitting particulate material such as indium oxide in a light-transmitting organic plastic matrix material such as ethyl hydroxyethyl cellulose or cyanoethyl cellulose plasticized with cyanoethyl phthalate.

As shown in FIG. 7, the segmented back electrode layer 5 is formed in accordance with the invention as a part of a composite back electrode subassembly 6 and comprises an array of discrete electrically conductive electrode sections or areas which correspond in shape and array to the particular pattern of illumination desired when an A.C. potential is applied across the front electrode 4 and one or more of the back electrode sections. In the case of the particular digital display or read-out device illustrated, the segmented electrode 5 is composed of seven bar-shaped principal electrode sections or areas 7 to 13 arranged in two side-by-side substantially square or parallelogram shaped patterns having a common side so as to delineate the block number eight which, as shown, may be located more or less centrally within and longitudinally aligned with the rectangularly shaped display area of the device. As shown, the electrode sections 7 to 13 are spaced apart a slight distance at the points where they meet, for example, a distance of around 1 mil, so as to be electrically insulated from each other. By applying an A.C. potential across the front electrode 4 and preselected ones of the back electrode sections 7 to 13, in the manner such as disclosed for example in the aforementioned U.S. Patent 2,922,993, any digit from 0 to 9 may be made to light up on the display panel. Preferably in addition, the composite back electrode layer 5 is also comprised of a small circularly shaped electrode section 14 in the form of a dot and located relative to the seven bar-shaped electrode sections 7 to 13 to serve as a decimal point for whatever digit may be displayed thereby. Also in accordance with the invention, the back electrode subassembly 6 is provided with a connector lead layer 15 located on the same side thereof as the electrode segments 7 to 13. As shown, the connector lead layer 15 may be of U-shaped configuration closely surrounding on three sides the block figure eight formed by the seven electrode segments 7 to 13. To improve the unlighted appearance of the display device, the two more or less square-shaped areas bounded by the electrode segments 7 to 13 are preferably blocked in with dummy or fill-in layer sections 16 and 17, as shown. The electrode sections 7 to 14, connector lead section 15 and the fill-in or dummy sections 16 and 17, are all located on and affixed to one side of a plastic insulator sheet 18 (FIG. 1) of low dielectric constant organic thermoplastic material to the other side of which is affixed a plurality of circuit leads **7*a* to 15*a* corresponding to and in surface contact with the respective electrode and connector lead sections 7 to 15 through respective apertures 19 which are formed in the insulator sheet 18 in registry with the electrode and connector lead sections 7 to 15. The assembly of the insulator sheet 18, together with the electrode sections 7 to 14, connector lead section 15 and the fill-in sections 16 and 17 on one side and the circuit leads 7*a* to 15*a* on its other side, forms the back electrode subassembly 6** of the display device.

In accordance with the invention, the composite back electrode subassembly 6 (FIG. 7) is formed by laminating under heat and pressure, and preferably by a single laminating operation, two sheets 20 and 21 of a suitable metal foil, such as aluminum foil or copper foil having a thickness of, for example, around .8 ml or so, to the opposite sides of a plastic insulator sheet 18 and over a plurality of apertures 19 therein to cause the metal foil sheets to surface engage with one another through the said apertures 19, as shown at 22 in FIG. 4. The apertures 19 are in registry with the respective areas of the insulator sheet 18 onto which are to be applied the individual electrode sections 7 to 14 and the connector lead section 15. For the purposes of the invention, the plastic insulator sheet 18 is formed of a suitable organic thermoplastic material having a low dielectric constant or permittivity. Examples of organic thermoplastic materials of low permittivity which may be suitably employed for the plastic insulator sheet 18 are polytetrafluoroethylene, polyethylene, and polychlorotrifluoroethylene. In the particular case illustrated, however, the plastic insulator sheet 18 is composed of a polychlorotrifluoroethylene film such as that commercially known as Kel F or Aclar having a thickness of around 2 mils or so. To produce better adherence of the aluminum foil sheets to the polychlorotrifluoroethylene insulator sheet 18, the aluminum foil, prior to its lamination to the insulator sheet, is precoated with an adherence promoting solution such as that commercially known as 6% Kel F solution. This assures against the etching solution, which in the later stages of the electrode subassembly manufacturing operation is used to etch away portions of the aluminum foil unprotected by an acid-resist coating, from cutting under the protectively coated foil areas and producing an irregular or ragged edge thereon. The lamination of the two metal foil sheets 20, 21 to the opposite sides of the plastic insulator sheet 18 may be carried out between two sheets of aluminum in a suitable hydrostatic laminating press such as, for example, that described and claimed in Fridrich Patent 3,047,052, at a suitable laminating pressure of, for example, around 200 pounds per square inch or so and at a suitable laminating temperature at which the plastic insulator sheet 18 will soften, for example, around 200° C. or so in the case of a polychlorotrifluoroethylene insulator sheet 18.

Following the fabrication of the metal foil-faced laminate 23 (FIGS. 3 and 4) as described above, protective coatings 7′ to 17′, and **7*a*′ to 15*a*′, of a suitable acid-resist material, such as that commercially known as Universal Resist No. R–511–5A made by the Advance Process Supply Company, is suitably applied, as by a conventional silk screening operation, in the desired electrode and connector lead area pattern 24 (FIG. 5) on one side of the laminate 23 and in the desired circuit lead area pattern 25 (FIG. 6) on the other side of the laminate 23. As shown, the acid-resist coating pattern 24 corresponds to the areas of the metal foil 20 which are to form the electrode sections 7 to 14, connector lead section 15 and fill-in sections 16 and 17, which sections are in registry with respective ones of the apertures 19 in the insulator sheet 18. Likewise, the acid-resist coating pattern 25 corresponds to the areas of the metal foil 21 which are to form the circuit leads 7*a* to 15*a* and which also are in registry with respective ones of the apertures 19 in the insulator sheet 18**.

After the protective acid-resist coatings 24, 25 have been applied to the opposite sides of the metal foil-faced laminate 23, the unprotected areas of the metal foil facings 20, 21 of the laminate not covered with acid-resist coating material are then chemically removed by suitably contacting the said unprotected metal foil areas with an etching medium or solution for the metal foil which is unreactive with respect to the acid-resist material employed for the protective coatings 24, 25. For this purpose, the protective coated laminate 23 may be simply immersed in a bath of the etching solution so that both sides of the laminate are etched simultaneously. In the case of metal foil sheets 20, 21 made of aluminum, a suitable etching material therefor is a ferric chloride solution such as, for example, that commercially known as "Etchant" manufactured by the Printed Circuit Division of Techniques, Inc., of Englewood, N.J. After the unprotected areas of the metal foil facings 20, 21 of the laminate 23 have been thus etched away, the acid-resist coatings 24 and 25 on the opposite sides of the laminate 23 are then suitably removed therefrom, as by dissolving them off the laminate by application thereto of a solvent for the acid-resist material, to expose the metal foil electrode and circuit lead patterns therebeneath, thereby completing the fabrication of the back electrode subassembly 6. Because of the surface engagement of the metal foil sheets 20, 21 with one another through the respective apertures 19 in the insulator sheet 18 of the laminate 23, each of the electrode and connector lead sections 7 to 15 is therefore electrically connected to its corresponding circuit lead **7*a* to 15*a***.

Especially in those cases where the segmented electrode sections and circuit leads of the display device are of minute configuration or are minutely spaced, they may be formed instead by the well known photoetching process, since with such a process the patterned electrode segments and circuit leads can be formed much more accurately, and to much closer tolerances and spacing, than with a process as described above involving a silk-screening operation for the application of an acid-resist coating in the pattern of the desired electrode and circuit lead configuration on the metal foil sheets 20, 21. In such a photoetching process, the metal foil sheets 20, 21 of the laminate 23 are coated in the desired electrode and circuit lead patterns 24, 25 with an acid-resistant photosensitive coating such as that commercially known as Photoresist, made by the Eastman Kodak Company of Rochester, N.Y. The photosensitive coatings on the metal foil sheets 20, 21 of the laminate 23 are then exposed to activating light, such as ultraviolet light, for example, under appropriate masks configurated to mask the light from all the areas of the photosensitive coatings other than the electrode and circuit lead patterns 24 and 25. The photosensitive coatings on the metal foil sheets 20, 21 are then developed, by a conventional photographic developing process, to effect the removal of all the unexposed areas of the photosensitive coatings on the metal foil sheets 20, 21 and leave protective coatings of acid-resist material thereon in the desired electrode and circuit lead patterns 24, 25 conforming to the patterns of the masks. The unprotected areas of the metal foil sheets 20, 21 are then chemically removed in the same manner as before, i.e., by immersing the laminate 23 in a bath of an etchant for the metal foil, after which the acid-resistant coatings 24 and 25 on the opposite sides of the laminate 23 are then suitably removed therefrom as before, i.e., by dissolving them off the laminate by application thereto of a solvent for the acid-resistant material.

The back electrode subassembly 6 formed as described above is then trimmed to proper size and provided, on the side thereof carrying the segmented back electrode layer 5, with the previously mentioned insulating layer 3, phosphor-bearing layer 2, and light-transmitting front electrode layer 4 to form an electrically active assembly which, by itself, may be utilized as an electroluminescent display device. The insulating layer 3, phosphor layer 2, and front electrode layer 4 may be applied to the back electrode subassembly 6 in any suitable manner. Thus, where the front electrode layer 4 is comprised of an electrically conductive lacquer as referred to hereinabove, the three layers 3, 2 and 4 may be successively coated in the form of suspensions directly onto the back electrode subassembly 6 as by means of a conventional doctor blade coating device, with each layer being dried before application of the next layer thereto. Preferably, however, the phosphor layer 2 and insulating layer 3 are preliminarily coated in the form of suspensions onto a temporary support or release sheet of a thin, flexible film material such as polyethylene terephthalate or polytetrafluoroethylene, which are commonly known as Mylar and Teflon, respectively, from which they are then removed or peeled off as an integrated multilayer film 26, as shown in FIG. 9. Also, and particularly in the case where the front electrode layer 4 is comprised of an electrically conductive light-transmitting lacquer as referred to hereinabove, the front electrode layer 4, instead of being formed as a coating on the phosphor layer 2, is preferably coated on a thin, flexible sheet 27 of a suitable transparent organic thermoplastic material, preferably one having hydrophilic properties, i.e., has an affinity for water. Examples of suitable plastic sheet materials having such hydrophitlic properties are nylon 6, 6, and nylon 6 such as those commercially known as Caplene and Capran. The composite coated sheet 28 thus formed may then be laminated under pressure and heat together with either a composite back electrode subassembly 6 coated with the insulating and phosphor layers 3 and 2, or together with a composite back electrode subassembly 6 and a separate multilayer film 26 composed of the insulating and phosphor layers 3 and 2, to form the electrically active electroluminescent display device assembly.

Because the light output of an electroluminescent cell or lamp deteriorates rapidly on exposure to water vapor, such as the moisture normally present in the atmosphere, it is preferable to encapsulate the electrically active elements of the electroluminescent display device 1 according to the invention in a substantially vapor-tight enclosure as well as to also incorporate suitable water-vapor barrier layers therein. Accordingly, as shown in FIGS. 10 and 11, the electrically active elements 2, 3 and 4 and the composite back electrode subassembly 6 of the electroluminescent display device 1 according to the invention are preferably laminated between outer encapsulating sheets 29 and 30 of light-transmitting thermoplastic material of low water-vapor permeability which overreach the margins of the elements 2, 3, 4, 5 and 6 and are sealed together around their marginal edges, with contact terminal members **7*b* to 15*b* embedded in the marginal seal and projecting outwardly therebeyond. The outer encapsulating sheets 29 and 30** are made of a light-transmitting organic thermoplastic material of tough and stable character and high impermeability to moisture and preferably flexible in nature. Among the materials which may be satisfactorily employed for this purpose are polyethylene, polytetrafluoroethylene, polychlorotrifluoroethylene, polystyrene, methyl methacrylate, polyvinylidine chloride, polyvinyl chloride, polycarbonate materials such as, for example, the reaction products of diphenyl carbonate and Bisphenol A, and polyethylene terephthalate. The material preferably employed for such purpose, however, consists of polychlorotrifluoroethylene film, such as that commercially known as Kel F or Aclar, preferably around 5 mil thickness.

To produce such an encapsulated electroluminescent display device 1 according to the invention, the composite back electrode subassembly 6, after being trimmed to proper dimensional size, is simply stacked together with the other component elements of the electroluminescent display device between the two plastic outer encapsulating sheets 29 and 30, as in the manner shown in FIG. 10 for example, to form a lay-up assembly 31 which is then laminated together under heat and pressure, preferably in an evacuated chamber, to form the completed electroluminescent display device 1 according to the invention. As shown in FIG. 8, the terminal contact members **7*b* to 15*b* for the respective circuit leads 7*a* to 15*a*, are preferably temporarily fastened or tacked in place on the back plastic encapsulating sheet 30 prior to the lamination thereof together with the other components of the display device. The terminal contact members 7*b* to 15*b* are fastened in proper positions on the back encapsulating sheet 30 to underlie and electrically contact with the outer end portions of the respective circuit leads 7*a* to 15*a* when the display device components are laminated together, and to project outwardly beyond the edge of the display device, as shown in FIG. 11. The terminal contact members 7*b* to 15*b*, which may suitably consist of copper strip or aluminum foil or ribbon, or preferably a wire cloth such as Phosphor-bronze cloth for example, may be temporarily tacked in place to the plastic encapsulating sheet 30 by suitably softening small underlying localized areas of the sheet, as by means of a soldering iron for instance, at points adjacent its outer marginal edge. During the laminating of the display device 1, the terminal contact members 7*b* to 15*b* become embedded in the marginal seal between the outer encapsulating sheets 29, 30**.

In making the lay-up assembly 31 in readiness for the lamination together thereof, the back electrode subassembly 6 is placed on top the bottom plastic encapsulating sheet 30 with its segmented electrode side 5 facing upwardly and with its circuit leads **7*a* to 15*a* in proper registration with the respective terminal contacts 7*b* to 15*b* on the encapsulating sheet 30 so as to contact therewith. The preformed multilayered film 26 comprised of the phosphor layer 2 and the insulating layer 3 is placed in proper position on top the segmented electrode-carrying side of the composite back electrode subassembly 6 so as to completely overlie all the electrode segments 7 to 14 but leave exposed therebeneath a portion of the conneector lead section 15. To this end, the multilayered film 26 comprised of the phosphor layer 2 and insulating layer 3 may be made of shorter length than the overall length of the figure eight pattern of the segmented electrode layer 5 so as not to overlie the base or bridging section of the U-shaped connector lead 15. The multilayer sheet 28 comprised of a thermoplastic water-vapor barrier sheet 27 faced with a front light-transmitting electrode layer 4 comprised of a coating of a light-transmitting electrically conductive lacquer as described hereinabove is then placed over the composite phosphor-insulator layer film 26, with its conductive electrode side 4 next to the phosphor layer 2, following which the front thermoplastic encapsulating sheet 29** is then placed in proper position on top the stacked assembly.

The laminating of the lay-up assembly 31 may be carried out in any suitable laminating press which will subject the assembly to laminating heat and pressure, while under a vacuum for removing undesired gaseous materials therefrom. For such purpose, the lamination of the lay-up assembly 31 may be advantageously performed in the manner, and by the use of a hydrostatic laminating press such as described and claimed in Fridrich et al. Patent 2,945,976 or in Fridrich Patent 3,047,052. The stacked lay-up assembly 31 is placed between the top and bottom press platens of the hydrostatic press, beneath a conformable diaphragm positioned between the press platens, the conformable diaphragm being constituted of a flexible gas-impervious sheet material such as soft-annealed aluminum foil or polyethylene terephthalate film such as Mylar. Compressed air or other fluid is admitted into the closed chamber of the press over the diaphragm therein to exert hydrostatic pressure on the stacked lay-up assembly 31, vacuum is applied under the diaphragm to remove any trapped gases or moisture from the space therebelow and from the lay-up assembly 31 in the said space, and heat is then applied by suitable means to the stacked assembly, as by passing an electric current through the metal foil diaphragm, in order to cause the plastic encapsulating sheets 29 and 30 to soften and seal together at their margins so as to encapsulate the lay-up assembly 31. During the laminating process, the terminal contact members **7*b* to 15*b* become embedded in the marginal seal between the plastic sheets 29, 30. At the same time, the circuit leads 7*a* to 15*a* are pressed into intimate contact with the terminal contact members 7*b* to 15*b* so as to make good electrical contact therewith. Likewise, the front electrode layer 4 is pressed into intimate contact with the portion of the connector lead layer 15 which is left exposed beneath the multilayer film 26 of the phosphor and insulating layers 2 and 3, thus making good electrical contact therewith also. The electrical connection of the front electrode layer 4 to the connector lead layer 15 of the back electrode subassembly 6, in place of being made along one of the marginal edges of the front electrode layer 4 as in the manner shown in FIGS. 10 and 11, may be made instead in the manner shown in FIG. 15 through one or more apertures 32 (FIG. 9) provided for such purpose in the composite phosphor layer-insulator layer film 26 so as to be in registry with one or more areas of the connector lead layer 15 in the lay-up assembly 31**.

As shown in FIG. 12, the electroluminescent display device 1 according to the invention may be provided with a completely water-vapor impermeable additional back barrier layer on the nonlight-transmitting side of the display device. For this purpose, a thin layer 33 of metal foil, such as aluminum foil for example of .8 mil thickness, is laminated to the under side of the bottom plastic encapsulating sheet 30 so as to completely underlie the same, and an additional sheet 34 of organic thermoplastic material highly impermeable to moisture, such as a polychlorotrifluoroethylene film, for example, that commercially known as Kel F or Aclar and having a thickness of approximately 2 mils, is then laminated over the aluminum foil sheet 33 so as to completely cover the same. Because of its complete impermeability to water-vapor, the metal foil backing sheet 33 thus affords complete protection against the ingress of moisture into the display device 1 through the back side thereof.

For certain applications, as for instance where it is desired to adapt the display device 1 for sliding insertion of its terminal contacts **7*b* to 15*b* into a lampholder socket, the display device may be provided with suitable stiffening means such as shown in FIGS. 13 and 14 and disclosed and claimed in U.S. Patent 3,177,-391, Devol et al., dated Apr. 6, 1965, and assigned to the same assignee as the present invention. As therein disclosed, and as shown in FIGS. 13 and 14, such a stiffening means suitably comprises a layer 35 of open-weave cloth material, for instance, a cotton cloth material such as muslin cloth, preferably bleached muslin cloth, overlying and laminated to the outer side of the plastic encapsulating sheet 30 of the display device so as to be partially embedded in the plastic sheet 30 and thus interlocked therewith against relative displacement, and a stiffening overlay 36 of a relatively stiff thermoplastic sheet material in which the cloth layer 35 is also partially embedded so as to be likewise interlocked therewith against relative displacement. The stiff plastic sheet overlay 36 may be composed of any thermoplastic material having a softening or heat distortion temperature appreciably below, for example, at least 40° C. or so below, the laminating temperature of the lay-up assembly 31 so that the lamination of the plastic sheet overlay 36 to the previously laminated assembly 31 can be effected at a temperature which will not result in softening of any of the component layers of the laminated assembly 31 with consequent likelihood of damage thereto. Examples of thermoplastic material suitable for the plastic stiffening sheet or overlay 36 are cellulose acetate, cellulose acetate butyrate, polyethylene, acrylic resins, polystyrene and polycarbonate resins such as, for example, that commercially known as Lexan made by applicant's assignee, General Electric Company. The thermoplastic stiffening sheet or overlay 36 should be of sufficient thickness to impart the desired degree of stiffness to the finished electroluminescent display device 1. Thus, where polystyrene such as that commercially referred to as Hi-Impact polystyrene is emplayed for the plastic stiffening sheet 36, a sheet thickness around 30 mils or thereabout will impart ample stiffness to the finished electroluminescent display device 1**.

As shown in FIG. 14, the laminated cloth layer 35 and plastic stiffener sheet or overlay 36 preferably extend beyond the marginal edge of the device from which the terminal contact members **7*b* to 15*b* extend, in order to provide a projecting stiff support flange or electrical connection board 37 to which the terminal contact members 7*b* to 15*b* are laminated so as to lie approximately flush therewith. The rigid electrical connection or terminal board 37, with its flush-mounted terminal contact members 7*b* to 15*b*, affords a convenient means for mounting the display device 1 in, and electrically connecting its terminal members to the contacts of an electrical socket for the device, such as a conventional gang-type socket having its contacts arranged in a row and concealed within a slot-shaped opening in the socket housing. The display device 1 is insertable into such a socket by a simple push-in insertion of the terminal board portion 37** of the device into the slot-shaped opening of the socket so as to engage with the contacts therein.

In the operation of the electroluminescent display device 1 according to the invention, a source of alternating current potential is connected between the contact terminal **15*b* and any preselected one or more of the contact terminals 7*b* to 14*b*. The A.C. potential thus applied to the appropriate electrode section or sections 7 to 14 of the segmented electrode 5 causes the selected electrode section or sections to excite to luminescence the portions of the electroluminescent phosphor located between the said electrode section(s) and the front electrode 4. A corresponding luminous pattern, conforming to that of the energized back electrode section(s), is thus produced and emitted by the display device 1. By providing a suitable switching arrangement between the A.C. source and each of the contact terminals 7*b* to 14*b*, a selected luminous pattern, which in the case of the particular digital display device 1 illustrated may be in the form of any digit from 0 to 9, can thus be made to appear at the light-emitting or viewing side of the display device. For example, where it is desired to display the digit "1" as a lighted configuration, an electrical potential is applied across the front electrode 4 and the sections 7, 8 (or 10, 11) of the back electrode 5. During the operation of the display device, the plastic insulator sheet 18 of low permittivity which, in accordance with the invention, is provided between the leads 7*a* to 14*a* and the segmented electrode layer 5 to electrically insulate them from one another other than at their points of connection, prevents the leads 7*a* to 14*a* from effectively capacitatively coupling to the light-transmitting front electrode layer 4 and so exciting to luminescence the overlying portions of the electroluminescent phosphor layer 2** to the detriment of the appearance of the luminous pattern produced by the display device.

Because of the greatly increased tensile strength of the metal foil of which the electrode sections 7 to 14, connector lead 15 and the circuit leads 7a to 14a are constituted, as compared to that of the silver or other type electrically conductive silk-screen inks or paints heretofore proposed for such electrode sections and circuit leads in display devices of the heat-laminated type, the metal foil electrode sections and circuit leads are therefore able to withstand, without breaking or fissuring, the tensile stresses to which they are normally subjected during the heat lamination of the display device by reason of the considerable difference in the heat expansion coefficients, and therefore in the degree of expansion, between the metal foil electrode sections and circuit leads on the one hand and the plastic insulator sheet on which they are laminated on the other hand. As a result, electroluminescent display devices constructed according to the invention do not suffer from disruption of the electrical continuity of their electrode sections and circuit leads, during the heat lamination of the device, such as would otherwise render the device inoperable. The production manufacture, therefore, of such flexible heat-laminated type electroluminescent display devices can be accomplished with substantially complete freedom from production rejects due to such electrical discontinuity faults. In addition, the laminating of the two metal foil sheets 20, 21 together through the apertures 19 in the insulator sheet 18 assures the positive electrical connection of all the electrode sections 7 to 14 to their respective circuit leads 7a to 14a at all times. Thus, display devices according to the invention will not become inoperative because of any interruptions in such electrical connections.

What I claim as new and desire to secure by Letters Patent of the United States is:

1. An electroluminescent display device comprising a segmented back electrode assembly comprised of an apertured insulator sheet of low dielectric constant organic thermoplastic material provided on one side with a segmented back electrode layer consisting of a plurality of discrete electrode sections and on its other side with a plurality of individual circuit leads, said insulator sheet having a plurality of apertures therein registered with respective ones of said electrode sections, said electrode sections and circuit leads being constituted by the residue of metal foil sheets laminated to the opposite sides of the insulator sheet and directly to each other through the said apertures therein and respectively etched in the patterns of the said electrode sections and the said circuit leads, an electroluminescent phosphor layer overlying the said insulator sheet and the segmented back electrode thereon, and a light-transmitting front electrode layer overlying said phosphor layer, said circuit leads terminating in contact portions exteriorly of said device and being shielded by said insulator sheet against effectively coupling capacitatively to the said front electrode upon application of an A.C. potential to the said leads and front electrode.

2. An electroluminescent display device as specified in claim 1 having, in addition, an insulating layer of high dielectric constant material disposed between the said phosphor layer and the said segmented back electrode.

3. An electroluminescent display device as specified in claim 1 wherein the said electrode sections and circuit leads consists of aluminum foil.

4. An electroluminescent display device as specified in claim 1 wherein the said insulator sheet is further provdied on its said one side with a metal foil connector lead adhered thereto and electrically connected to the said front electrode layer, the said insulator sheet having at least one of its said apertures in registry with said connector lead and said connector lead being adhered to and electrically connected with a respective one of said circuit leads through the said one aperture.

5. An electroluminescent display device as specified in claim 4 wherein the said connector lead and front electrode have portions extending beyond the marginal edge of the phosphor layer and in surface interengagement to thereby provide the said electrical connection between the connector lead and the front electrode.

6. An electroluminescent display device as specified in claim 4 wherein the said phosphor layer is provided with at least one aperture in registry with the said connector lead and through which aperture the said connector lead and front electrode are in surface interengagement to thereby provide the said electrical connection therebetween.

7. An electrode subassembly for an electroluminescent display device comprising an apertured insulator sheet of low dielectric constant organic thermoplastic material provided on one side with a plurality of electrode sections and on its other side with a plurality of circuit leads, said insulator sheet having a plurality of apertures therein registered with respective ones of said electrode sections, the said electrode sections and circuit leads being constituted by the residue of metal foil sheets laminated to the opposite sides of the insulator sheet and directly to each other through the said apertures therein and respectively etched in the patterns of the said electrode sections and the said circuit leads.

8. An electrode subassembly as specified in claim 7 having, in addition, a metal foil connector lead adhered to the said one side of said insulator sheet, said insulator sheet having at least one of its said apertures registered with said connector lead and said connector lead being electrically interconnected with a respective one of said circuit leads through the said one aperture.

References Cited

UNITED STATES PATENTS

| | | | |
|---|---|---|---|
| 2,716,298 | 8/1955 | Spielmann et al. | 313—108 X |
| 3,219,865 | 11/1965 | Vodicka | 313—108 |
| 3,280,370 | 10/1966 | Nehrich et al. | 313—108 X |
| 3,281,619 | 10/1966 | Greene | 313—108 |
| 3,289,198 | 11/1966 | Dickson et al. | 313—108 X |
| 3,312,852 | 4/1967 | Motson | 313—108 |

JAMES W. LAWRENCE, *Primary Examiner.*

PALMER C. DEMEO, *Assistant Examiner.*

U.S. Cl. X.R.

313—109.5